(12) United States Patent
Tamura et al.

(10) Patent No.: US 6,746,802 B2
(45) Date of Patent: Jun. 8, 2004

(54) ELECTRODE FOR LITHIUM SECONDARY BATTERY AND LITHIUM SECONDARY BATTERY

(75) Inventors: Noriyuki Tamura, Katano (JP); Ryuji Ohshita, Tokushima (JP); Maruo Kamino, Katano (JP)

(73) Assignee: Sanyo Electric Co., Ltd., Osaka (JP)

(*) Notice: Subject to any disclaimer, the term of this patent is extended or adjusted under 35 U.S.C. 154(b) by 271 days.

(21) Appl. No.: 10/092,250

(22) Filed: Mar. 7, 2002

(65) Prior Publication Data
US 2002/0172862 A1 Nov. 21, 2002

(30) Foreign Application Priority Data

Mar. 8, 2001 (JP) .......................... 2001-065173

(51) Int. Cl.[7] .................. H01M 4/66; H01M 4/48; H01M 4/62
(52) U.S. Cl. ................. 429/245; 429/218.1; 429/231.1
(58) Field of Search .................. 429/209, 218.1, 429/231.1, 233, 245

(56) References Cited

U.S. PATENT DOCUMENTS 5,616,437 A * 4/1997 Gao ........................... 429/245
5,795,679 A * 8/1998 Kawakami et al. ........ 429/218.1
6,534,217 B2 * 3/2003 Koga et al. ............ 429/231.95
2002/0028381 A1 * 3/2002 Heider et al. ............. 429/218.1

FOREIGN PATENT DOCUMENTS

| JP | 07-122274 A | 5/1995 |
| JP | 08-124568 A | 5/1996 |
| JP | 10-021913 A | 1/1998 |
| JP | 10-316426 A | 12/1998 |
| JP | 11-242954 A | 9/1999 |

OTHER PUBLICATIONS

Ian A. Courtney et al.: "Electrochemical and In Situ X-ray Diffraction Studies of the Reaction of Lithium with Tin Oxide Composites", J. Electrochem. Soc., vol. 144, No. 6, pp. 2045–2052, (Jun., 1997).

* cited by examiner

Primary Examiner—Stephen Kalafut
Assistant Examiner—Tracy Dove
(74) Attorney, Agent, or Firm—Kubovcik & Kubovcik

(57) ABSTRACT

An electrode for a lithium secondary battery comprises a current collector composed of a metal incapable of alloy formation with lithium, a thin film formed by depositing on the current collector and composed of an active material containing tin as a main component, and a tin oxide layer formed on the surface of the thin film.

7 Claims, 2 Drawing Sheets

ELECTRODE FOR LITHIUM SECONDARY BATTERY AND LITHIUM SECONDARY BATTERY

BACKGROUND OF THE INVENTION

1. Field of the Invention

The present invention relates to an electrode for a lithium secondary battery and a lithium secondary battery using the electrode.

2. Related Art

The battery performance of lithium secondary batteries recently under intensive research and development, such as charge-discharge voltage, cycle life characteristics or storage characteristics, depends largely upon the types of the electrodes used. This has led to the attempts to better battery performance by improving electrode active materials.

The use of metallic lithium for the negative active material, although possible to construct a battery with high energy density per weight and volume, presents a problem that the lithium deposited on charge grows into dendrite which could cause internal short-circuiting.

Lithium secondary batteries are reported (Solid State Ionics, 113–115, p57 (1998)) which use an electrode consisting of aluminum, silicon, tin or the like that is electrochemically alloyed with lithium on charge.

We have found that among electrodes for a lithium secondary battery using tin as an active material, an electrode comprising a tin thin film deposited on a current collector such as a copper foil by electroplating or the like has a large discharge capacity and relatively good cycle characteristics. In such an electrode having a tin thin film as an active material, cycle properties are believed to be seriously affected by the reaction which is easy to take place between the surface of the thin film and an electrolyte solution.

SUMMARY OF THE INVENTION

It is the object of the present invention to provide an electrode for a lithium secondary battery using a thin film of the active material containing tin as a main component and being capable of suppressing the reaction between an electrolyte solution and the active material.

The present invention provides an electrode for a lithium secondary battery comprising a current collector composed of a metal incapable of alloy formation with lithium, a thin film formed by depositing on the current collector and composed of an active material containing tin as a main component, and a tin oxide layer formed on the surface of the thin film.

In the present invention, due to the presence of the tin oxide layer on the surface of the thin film, the reaction between the electrolyte and the active material can be suppressed and the initial charge-discharge efficiency can be improved. Further, it is supposed that due to the presence of the tin oxide layer on the surface of the thin film, an oxide coating film suitable for improving the charge-discharge cycle characteristics is formed by electrochemical oxidation of the electrolyte during initial charge. It is therefore supposed that such an oxide coating film suppresses the separation of the thin film from the current collector to provide the improvement of the charge-discharge cycle characteristics.

In the present invention, the tin oxide layer preferably has a concentration gradient that the concentration of the tin oxide gradually decreases toward the current collector. Further, the thickness of the tin oxide layer is preferably 10 nm or more.

The concentration gradient may be varied continuously or in step wise. Due to the presence of the concentration gradient, the reaction of the active material in the thin film surface with the electrolyte is more effectively suppressed, and the cracking of the thin film caused by charge and discharge is effectively controlled, thereby to prevent the separation of the thin film.

Further, the content of the oxide layer in the entire thin film is preferably in the range of the amount corresponding to the oxygen content of 0.3% or more by atomic ratio of oxygen element with respect to tin element in the entire thin film. It is also preferably corresponding to the oxygen content of 20% or less. Consequently, it is preferable that the tin oxide layer is formed on the surface of the thin film so that the oxygen content in the thin film is in a range from 0.3 to 20% by atomic ratio of oxygen element with respect to tin element. If the oxygen content is too low, the effect of the present invention to suppress reaction with the electrolyte may not be sufficiently achieved. On the contrary, if the oxygen content is too high, the charge-discharge efficiency may be decreased.

The thin film of the active material in the present invention is a thin film containing tin as a main component, and is not particularly restricted as far as it can store lithium by alloying and release lithium electrochemically. Examples of such a thin film are a tin film composed of substantially tin alone and an alloy thin film containing tin as a main component. The alloy thin film is exemplified by Sn—Pb, Sn—Co, and Sn—In thin films.

The tin oxide layer in the present invention may be any oxide layer containing tin oxide as a main component. For example, in the case the thin film is composed of a tin alloy, the tin oxide layer may contain an oxide of alloying element other than tin.

The thin film in the present invention can be formed by vapor phase or liquid phase deposition. For example, the thin film can be formed by a thin-film forming method such as electrolytic plating, electroless plating, CVD, sputtering, vacuum evaporation, spraying or the like.

The tin oxide layer in the present invention can be formed by various methods. For example, the tin oxide layer can be formed by oxidizing the surface of the thin film. Further, as another method, the tin oxide layer can be formed by depositing the tin oxide layer on the surface of the thin film.

The method for oxidizing the surface of the thin film is exemplified by a method of heat treatment of the thin film in the presence of oxygen. If the tin oxide layer is formed by oxidizing the surface of the thin film, the concentration gradient gradually decreasing the concentration of tin oxide toward the current collector can be easily provided.

In the method for forming the tin oxide layer by heat treatment in the presence of oxygen, the heat treatment temperature is preferably about 50 to 105% of the melting point of tin. Since the melting point of tin is 232° C., it is preferably within a range from 116° C. to 243° C., and taking the reactivity of oxidation into consideration, it is further preferably within a range from 160° C. to 240° C.

Examples of the method for depositing the tin oxide layer are sputtering, vacuum evaporation, MOCVD, composite plating, and the like. After deposition of the thin film, the tin oxide layer is deposited by these methods to form the thin film having the tin oxide layer on the surface thereof.

In the case of forming the tin oxide layer by the sputtering method, for example, the tin oxide layer can be deposited using tin metal as a target and argon gas containing oxygen as the atmospheric gas. In this case, the oxygen concentration can be controlled by the flow rate of oxygen so as to control the concentration of tin oxide in the thickness direction of the thin film. For example, the oxygen gas flow rate is increased along with the deposition of thin film, the tin oxide concentration is decreased gradually toward the current collector. In other words, the concentration gradient with the tin oxide concentration gradually increasing toward the surface can be formed.

After the thin film of the active material is formed by the sputtering method, the tin oxide layer can be successively formed by adding oxygen gas to the atmospheric gas in the sputtering method. Consequently, the formation of the tin oxide layer by the sputtering method is especially useful in the case of forming the thin film by the sputtering method.

Formation of the tin oxide layer by the vacuum evaporation method can be carried out using tin oxide as an evaporation source.

In the case of the MOCVD method, the tin oxide layer can be formed by CVD using an organic metal such as an organic tin compound.

In the case of the composite plating method, the tin oxide layer can be formed by using a plating bath in which fine particles of tin oxide is dispersed and depositing tin oxide simultaneously with deposition of tin metal.

The tin oxide in the tin oxide layer may be single or a composite oxide containing tin oxides with different valence. The valence of tin in the tin oxide is preferable to be low since the initial charge-discharge efficiency is increased in such a case. Consequently, the tin oxide layer is preferable to contain SnO as a main component.

The crystallinity of tin oxide in the tin oxide layer is not specifically restricted and may be amorphous.

In the present invention, it is preferable that a mixed phase, in which the thin film component and the current collector component are mixed, is formed in the interface between the thin film and the current collector. Such a mixed phase can be formed by heat treating the thin film formed on the current collector, for example. Accordingly, the mixed phase may be formed simultaneously when the surface of the thin film is heat treated in the presence of oxygen for forming the oxide layer. The mixed phase may be composed of an intermetallic compound or solid solution of the thin film component and the current collector component. In the case Cu is the current collector component, an intermetallic compound of Sn and Cu may be formed in the mixed phase and a solid solution of Sn and Cu may be formed. Whether the mixed phase is composed of the intermetallic compound or the solid solution is determined by the thin film component, the current collector component, the composition ratio thereof, the mixed-phase forming conditions or the like.

In the present invention, the current collector is made of a metal incapable of alloy formation with lithium. The metal incapable of alloy formation with lithium is a metal which does not form a solid solution or an intermetallic compound with lithium (Li). Practically, a metal having no alloying state with Li in a binary phase diagram. Examples of the metal incapable of alloy formation with lithium include copper (Cu), iron (Fe), nickel (Ni), cobalt (Co), molybdenum (Mo), tungsten (W) and tantalum (Ta). Among these metals, copper is especially preferable to be used. The current collector is preferably thin and its thickness is preferably 50 $\mu$m or less. From such a viewpoint, a metal foil, especially a copper foil is preferable to be used as the current collector.

It is preferable for the surface of the current collector to be rough. The rough surface improves the adhesion between the thin film and the current collector and suppresses the separation of the thin film from the current collector during charge and discharge. More specifically, the surface roughness Ra of the current collector is preferably about 0.01 to 2 $\mu$m. The surface roughness Ra, which is specified by Japanese Industrial Standards (JIS B 0601–1994), can be measured by a surface roughness gage, for example. In the case a copper foil is used as the current collector, an electrolytic copper foil, which is a copper foil with a large surface roughness Ra, is preferable to be used.

The lithium secondary battery of the present invention comprises a negative electrode composed of the electrode of the present invention described above, a positive electrode, and a nonaqueous electrolyte.

An electrolyte solvent for use in the lithium secondary battery of the present invention is not particularly limited in type but can be illustrated by a mixed solvent which contains cyclic carbonate such as ethylene carbonate, propylene carbonate, butylene carbonate, or vinylene carbonate and also contains chain carbonate such as dimethyl carbonate, methyl ethyl carbonate or diethyl carbonate. Also applicable is a mixed solvent of the above-listed cyclic carbonate and an ether solvent such as 1,2-dimethoxyethane or 1,2-diethoxyethane or a chain ester such as $\gamma$-butyrolactone, sulfolane or methyl acetate. Illustrative electrolyte solutes are $LiPF_6$, $LiBF_4$, $LiCF_3SO_3$, $LiN\,(CF_3SO_2)_2$, $LiN(C_2F_5SO_2)_2$, $LiN\,(CF_3SO_2)(C_4F_9SO_2)$, $LiC\,(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$ and mixtures thereof. Other applicable electrolytes include a gelled polymer electrolyte comprised of an electrolyte solution impregnated into a polymer electrolyte such as polyethylene oxide, polyacrylonitrile or polyvinylidene fluoride, and inorganic solid electrolytes such as LiI and $Li_3N$, for example. The electrolyte for the lithium secondary battery of the present invention can be used without limitation, so long as an Li compound as its solute that imparts an ionic conductivity, as well as its solvent that dissolves and retains the Li compound, remain undecomposed at voltages during charge, discharge and storage of the battery.

Examples of positive active materials for the present invention include lithium-containing transition metal oxides such as $LiCoO_2$, $LiNiO_2$, $LiMn_2O_4$, $LiMnO_2$, $LiCo_{0.5}Ni_{0.5}O_2$ and $LiNi_{0.7}Co_{0.2}Mn_{0.1}O_2$; lithium-free metal oxides such as $MnO_2$; and the like. Other substances can also be used, without limitation, if they are capable of electrochemical insersion and release of lithium.

DESCRIPTION OF THE PREFERRED EXAMPLES

Hereinafter, the present invention will be described further in details according to examples, yet the present invention is not at all restricted to the following examples and may includes various modifications or embodiments as fall within the scope of the present invention.

[Production of electrodes]

A tin thin film with a thickness of 2 $\mu$m was formed on an electrolytic copper foil (the surface roughness Ra=0.188 $\mu$m) with a thickness of 18 $\mu$m by an electroplating method. In the electroplating, tin was used as an anode and the plating bath with the composition shown in Table 1 was used.

TABLE 1

| Substance | Concentration |
|---|---|
| Stannous Sulfate | 40 g · dm$^{-3}$ |
| Sulfuric Acid (98%) | 150 g · dm$^{-3}$ |
| Formalin | 5 cm$^3$ · dm$^{-3}$ |
| Additive (Produced by Uyemura Kogyo, Ltd) | 40 cm$^3$ · dm$^{-3}$ |

The copper foil on which the tin thin film was formed was divided into two and one of them was heated at 240° C. for 24 hours in air to obtain an electrode A1 of the present invention. The remaining one was heated at 240° C. for 24 hours in vacuum to obtain a comparative electrode B1.

Figure 1:
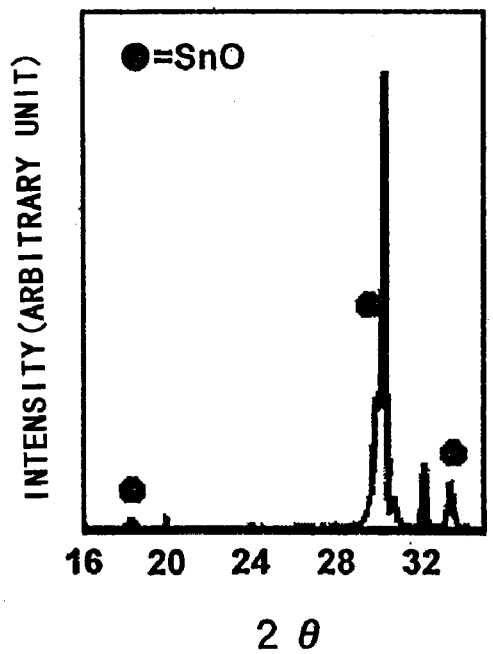
FIG. 1 shows an x-ray diffraction pattern of an electrode A1 of an example in accordance with the present invention.

The thin film on the electrode surface after the heat treatment was subjected to x-ray diffraction analysis (XRD, radiation source: CuKα). FIG. 1 is an XRD pattern of the electrode A1 of the present invention and FIG. 2 is an XRD pattern of the comparative electrode B1.

Figure 2:
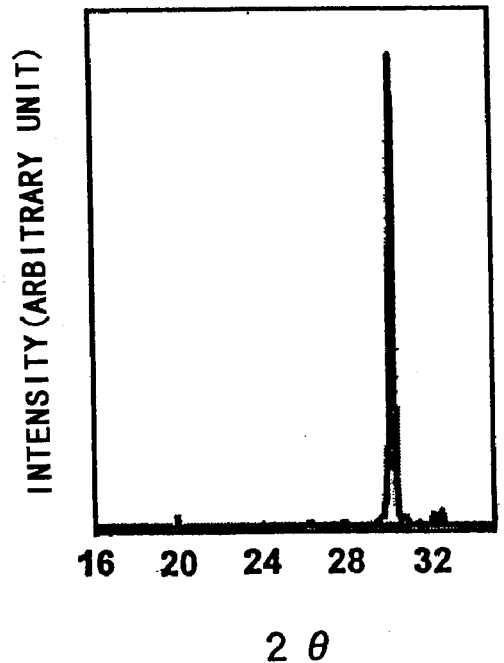
FIG. 2 shows an x-ray diffraction pattern of an electrode B1 of a comparative example.

From FIG. 1 and FIG. 2, a peak of SnO was observed in the electrode A1 of the present invention. It proves the formation of the tin oxide layer on the surface of the tin thin film of the electrode A1.

[Production of electrolyte solution]

An electrolyte solution was produced by dissolving 1 mole/liter of LiPF$_6$ in a mixed solvent of ethylene carbonate and diethyl carbonate in ratio of 1:1 by volume.

[Production of beaker cell]

Figure 3:
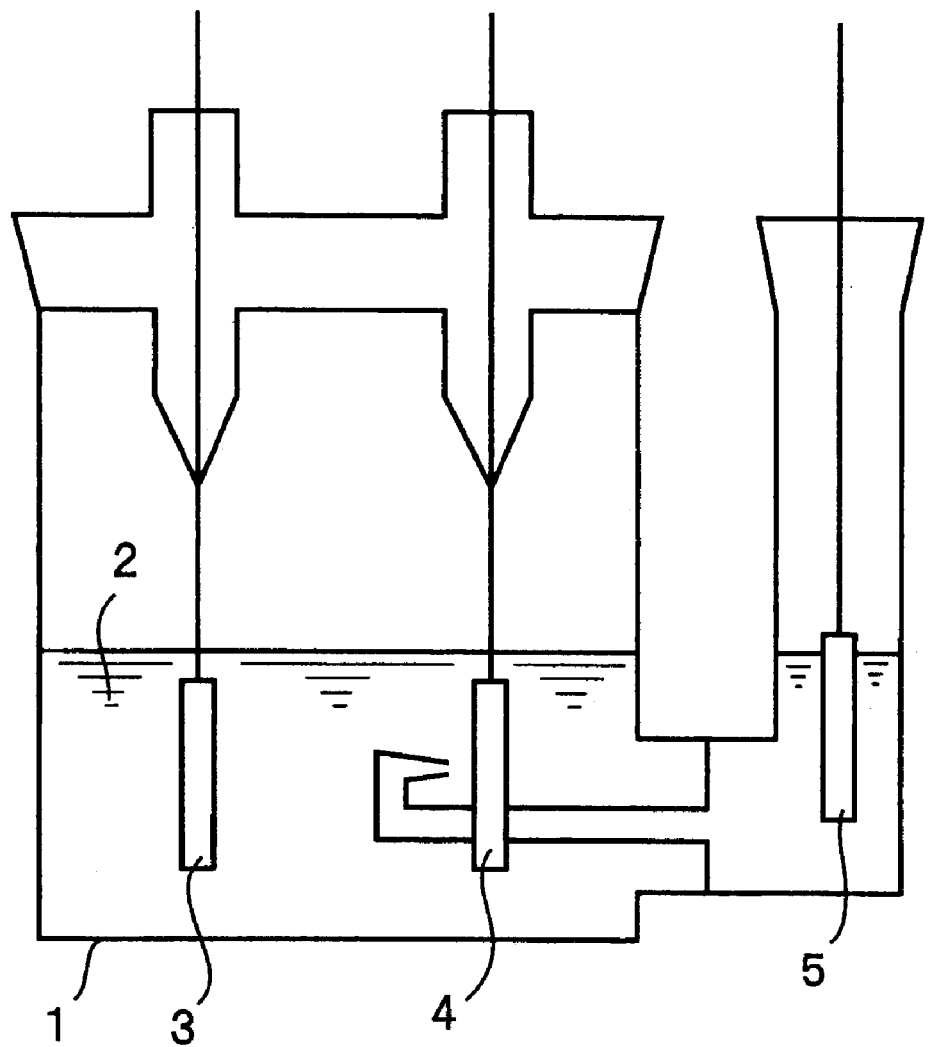
FIG. 3 is a schematic cross-sectional view showing a beaker cell produced in an example.

Using the above-described electrodes A1 and B1 as work electrodes, beaker cells as shown in FIG. 3 were produced. As shown in FIG. 3, the beaker cells were composed by immersing a counter electrode 3, a work electrode 4, and a reference electrode 5 in an electrolyte solution charged in a container 1. As the electrolyte solution 2, the above-described electrolyte solution was used and as the counter electrode 3 and the reference electrode 5, lithium metal was used respectively.

[Measurement of cycle characteristics]

Beaker cells produced in the above-described manner were respectively charged to 0 V (vs. Li/Li$^+$) with constant current of 0.2 mA at 25° C. and then discharged to 2V (vs. Li/Li$^+$) with constant current of 0.2 mA and after the cycle comprising such charging and discharging steps was repeated ten times, the capacity retention rate of each beaker cell defined by the following formula was calculated. The results are shown in Table 2. The reduction of the work electrodes was defined as charging and the oxidation of the work electrodes was defined as discharging.

Capacity retention rate (%)=(Discharge capacity at the tenth cycle/Discharge capacity at the first cycle)×100

Further, from the discharge capacity and the charge capacity at the first cycle, the initial charge-discharge efficiency defined by the following formula was calculated. The results are shown in Table 2.

Initial charge-discharge efficiency (%)=(Discharge capacity at the first cycle/Charge capacity at the first cycle)×100

TABLE 2

| Electrode | Capacity Retention Rate (%) | Initial Charge-Discharge Efficiency (%) |
|---|---|---|
| A1 | 90 | 91 |
| B1 | 71 | 84 |

As being made clear from the results shown in Table 2, the electrode A1 of the present invention having the tin oxide layer on the surface of the thin film was found having high capacity retention rate and excellent cycle characteristics as compared with the comparative electrode B1. Further, by observation of the surface state of the electrode after the charge-discharge cycle test, the separation of the thin film of the active material was confirmed to be a little in the electrode A1 of the present invention as compared with that in the comparative electrode B1.

The initial charge-discharge efficiency of the electrode A1 of the present invention was higher than that of the comparative electrode B1. Accordingly, it is supposed that the reaction between the active material and the electrolyte solution in the electrode A1 of the present invention was suppressed in the initial charge.

In the above-described example, the thin film of the active material was formed by the electroplating method, but the present invention is not at all restricted to the example and other chemical thin-film forming methods such as electroless plating, and physical thin-film forming methods such as CVD, sputtering, vacuum evaporation, and spraying may be employed to form the thin film of the active material.

Further, in the abobe-described example, the tin oxide layer was formed by oxidation of the surface of the thin film by heat treatment in the presence of oxygen, but the present invention is not at all restricted to that and above-described various method may be employed to form the tin oxide layer.

According to the present invention, in the electrode for a lithium secondary battery comprising the thin film containing tin as a main component on the current collector, the reaction between the electrolyte solution and the active material can be suppressed and cycle characteristics can be improved.

What is claimed is:

1. An electrode for a lithium secondary battery comprising a current collector composed of a metal incapable of alloy formation with lithium, a thin film formed by depositing on said current collector composed of an active material comprising tin or a tin alloy containing tin as a main component, and a tin oxide layer formed on the surface of said thin film.

2. The electrode for a lithium secondary battery according to claim 1, wherein said thin film is formed by an electrolytic plating method, an electroless plating method, a CVD method, a sputtering method, a vacuum evaporation method, or a spraying method.

3. The electrode for a lithium secondary battery according to claim 1, wherein said tin oxide layer is formed by a sputtering method, a vacuum evaporation method, an MOCVD method, or a composite plating method.

4. The electrode for a lithium secondary battery according to claim 1, wherein said tin oxide layer contains SnO as a main component.

5. The electrode for a lithium secondary battery according to claim 1, wherein said current collector is a copper foil.

6. The electrode for a lithium secondary battery according to claim 5, wherein said copper foil is an electrolytic copper foil.

7. A lithium secondary battery, comprising a negative electrode consisting of the electrode according to claim 1, a positive electrode, and a non-aqueous electrolyte.

* * * * *